(12) United States Patent
Gieras et al.

(10) Patent No.: US 8,390,160 B2
(45) Date of Patent: Mar. 5, 2013

(54) COMPACT ELECTROMECHANICAL ACTUATOR

(75) Inventors: Jacek F. Gieras, Glastonbury, CT (US); Gregory I. Rozman, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 585 days.

(21) Appl. No.: 12/687,152

(22) Filed: Jan. 14, 2010

(65) Prior Publication Data

US 2011/0169357 A1    Jul. 14, 2011

(51) Int. Cl.
*H02K 7/06* (2006.01)
(52) U.S. Cl. .................. 310/83; 310/156.02
(58) Field of Classification Search ........... 310/83, 310/156.02
See application file for complete search history.

(56) References Cited

U.S. PATENT DOCUMENTS

| | | | |
|---|---|---|---|
| 6,169,930 | B1 | 1/2001 | Blachek et al. |
| 6,657,329 | B2 | 12/2003 | Kastinger et al. |
| 6,807,877 | B2 | 10/2004 | Sato et al. |
| 6,848,327 | B2 | 2/2005 | Nagai et al. |
| 7,230,361 | B2 | 6/2007 | Hirzel |
| 7,328,596 | B2 | 2/2008 | Hasegawa et al. |
| 7,383,800 | B2 | 6/2008 | Kawakami et al. |
| 7,562,594 | B2 | 7/2009 | Nagai et al. |
| 2004/0026158 | A1 | 2/2004 | Rieth et al. |
| 2004/0036370 | A1* | 2/2004 | Hilzinger et al. ........... 310/83 |

FOREIGN PATENT DOCUMENTS

| | | |
|---|---|---|
| EP | 1246960 | 10/2004 |
| JP | 2008-141920 | 6/2008 |
| WO | 01/44554 | 6/2001 |
| WO | 2004/112217 | 12/2004 |

* cited by examiner

*Primary Examiner* — Nguyen N Hanh
(74) *Attorney, Agent, or Firm* — Carlson, Gaskey & Olds, PC

(57) ABSTRACT

An electromechanical actuator for controlling the position of an aircraft component has a linear actuator to be driven to position a component. A transverse flux motor drives the linear actuator to move in a linear direction and control the position of the component.

15 Claims, 7 Drawing Sheets

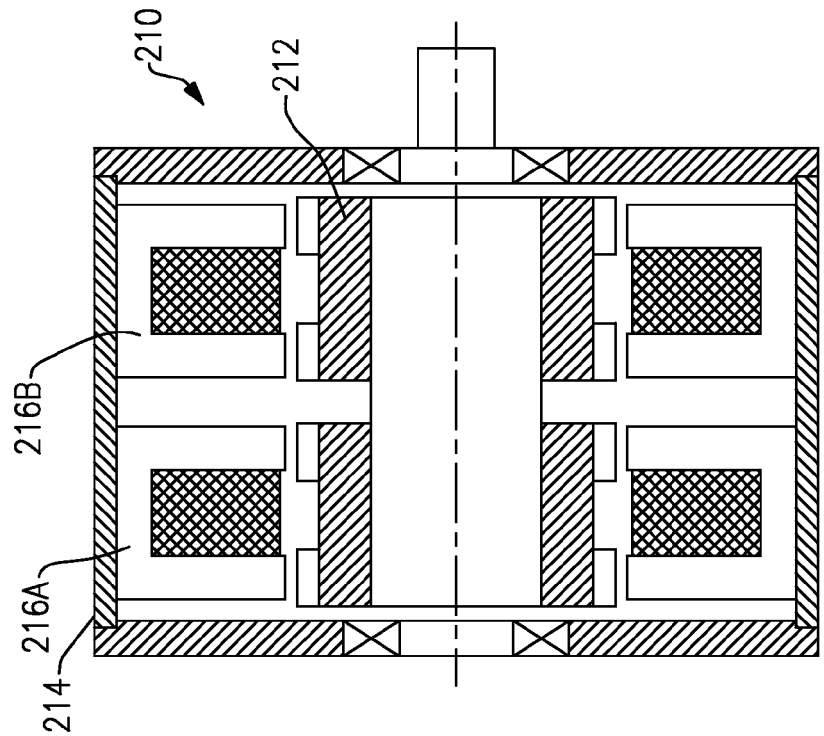
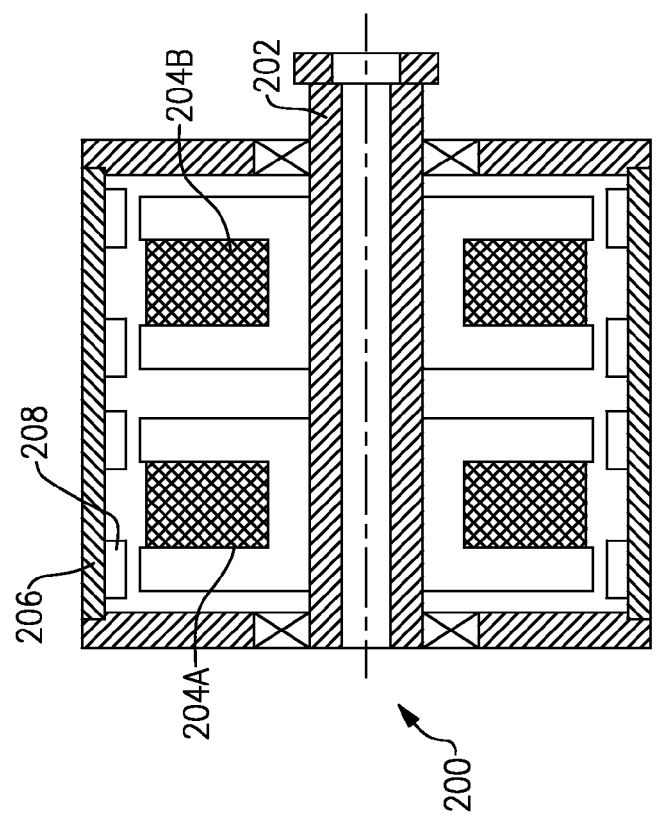
FIG. 7
FIG. 6

COMPACT ELECTROMECHANICAL ACTUATOR

BACKGROUND OF THE INVENTION

This application relates to the use of a transverse flux motor in an electromechanical actuator for aircraft application.

Aircraft are typically provided with a number of linear actuators to position various components. As an example, stabilizers, flaps, slats, spoilers, ailerons, elevators and rudders must be precisely positioned, and have their positions changed during flight.

In the prior art, electromechanical actuators having a standard electric motor (parallel flux motor) driving a linear actuator through a rotary to linear conversion are utilized. Due to the types of motors that have historically been utilized, a step-down gear box has also been included as the electric motors have typically provided higher speeds are needed at the actual aircraft components.

Due to the above restrictions, the resulting electromechanical actuators have been relatively high weight.

Transverse flux motors are known. However, they have not been utilized in conjunction with the above-referenced application.

SUMMARY OF THE INVENTION

An electromechanical actuator for controlling the position of an aircraft component has a linear actuator. A transverse flux motor drives the linear actuator to move in a linear direction and control the position of the component These and other features of the present invention can be best understood from the following specification and drawings, the following of which is a brief description.

BRIEF DESCRIPTION OF THE DRAWINGS

FIG. 6 shows another option of a transverse flux machine.
FIG. 7 shows another option of a transverse flux machine.

DETAILED DESCRIPTION OF THE EMBODIMENTS

Figure 1:
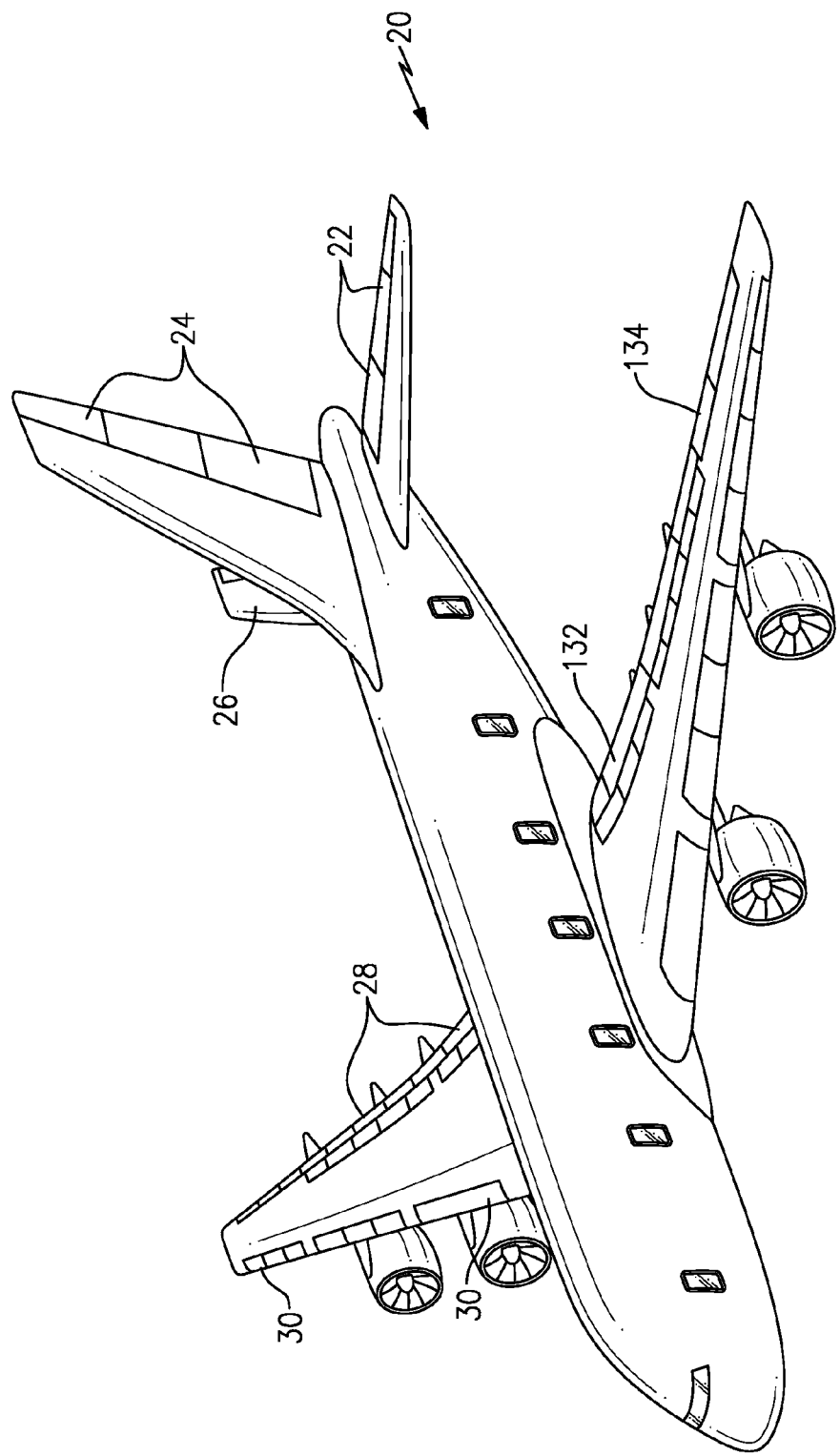
FIG. 1 shows an aircraft.

FIG. 1 shows an aircraft 20 which incorporates several components such as elevator 22, rudders 24, horizontal stabilizers 26, flaps 28, slats 30, spoilers 132, and ailerons 134. Each of these components are precisely positioned during flight dynamics to ensure proper flight by controlling aerodynamic properties. Typically, electromechanical actuators are utilized to move the components.

Figure 2:
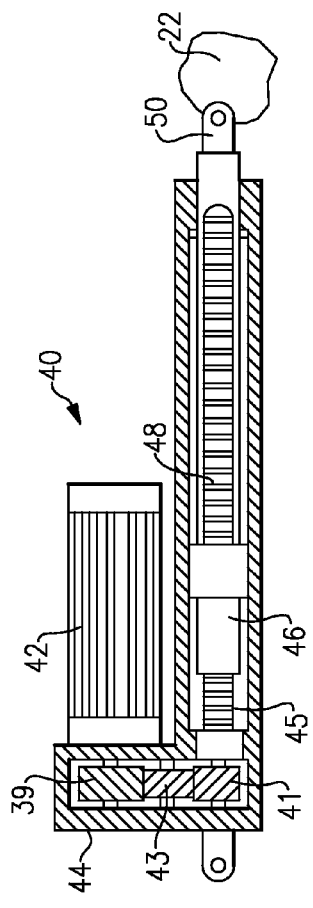
FIG. 2 shows a prior art electromechanical actuator.

FIG. 2 shows a prior art electromechanical actuator 40. A typical standard parallel flux motor 42 is utilized. Such motors typically deliver relatively high speed to a gear box 44. Thus, as shown, the gear box 44 includes a gear 39 driving idler gear 43 to in turn drive gear 41. These three required gears result in a relatively large and heavy gear box 44. The output of the gear 41 drives a threaded shaft 45. A ball screw 46 has an anti-rotation mechanism, which translates rotation of the threaded member 45 into linear movement of an output member 48. This mechanical connection is as known. The linear member 48 is connected to a device 50 which in turn moves the component, here an elevator 22.

Figure 3A:
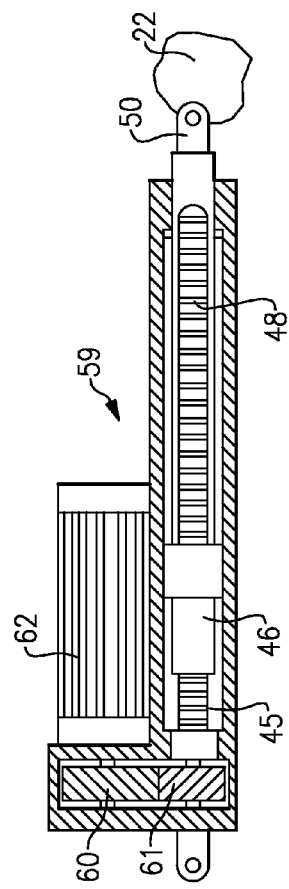
FIG. 3A shows a first arrangement of an inventive actuator.

FIG. 3A shows an inventive embodiment 59 wherein a transverse flux motor 62 is utilized. A transverse flux motor can provide a relatively lower speed because high input frequency is converted electromagnetically into low speed of the shaft. This is an inherent and most important feature of a transverse flux motor. The transverse flux motor 62 drives a first gear 60 which in turn drives a gear 61 to drive the threaded shaft 45. The remainder of the connection may be as known in the prior art.

Figure 3B:
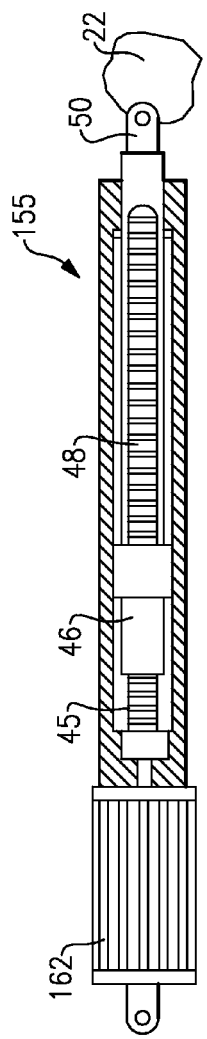
FIG. 3B shows an alternative arrangement

FIG. 3B shows an alternative arrangement 155 wherein the transverse flux motor 162 drives the shaft 45 directly.

As can be appreciated from FIGS. 3A and 3B, a reduction in weight is achieved with these arrangements compared to the prior art of FIG. 2.

Figure 4:
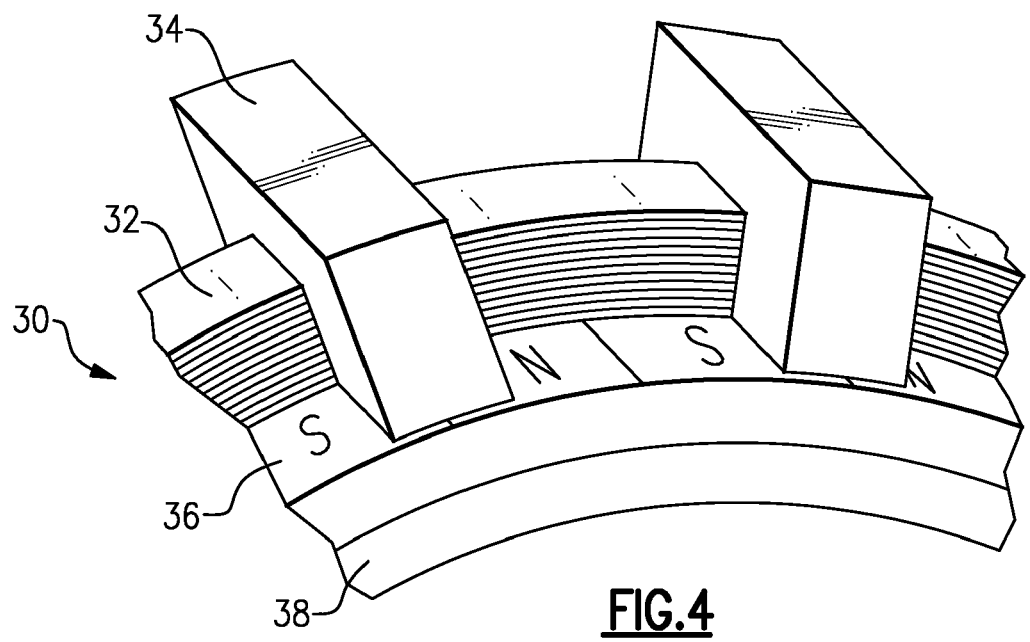
FIG. 4 shows a first type of transverse flux machine.

FIG. 4 shows a first arrangement 30 for a single sided machine, and shows a stator having cylindrical coil 32 associated with pole pieces 34. A rotor 38 is provided with permanent magnets 36.

Figure 5:
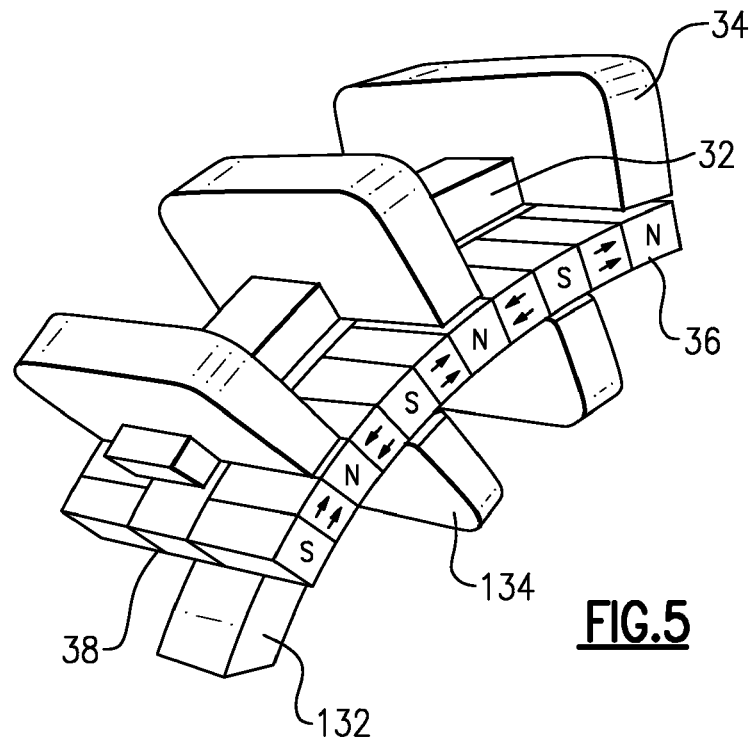
FIG. 5 shows an alternative transverse flux machine.

FIG. 5 shows a double-sided machine wherein there is an additional coil 132 and pole pieces 134 on an opposed side of the rotor 38.

These basic arrangements of transverse flux machines can be utilized in any of the embodiments as set forth below.

FIG. 6 shows a machine embodiment 200 which is single phase, and which is provided with two redundant channels 204A and 204B, such that it is fault tolerant. The embodiment of FIG. 6 has an internal stator 202 surrounded by the rotor 206 and its permanent magnets 208. The internal stator application is particularly useful for this aircraft application in that it results in a relatively smaller volume envelope, and lighter weight.

FIG. 7 shows another embodiment 210, wherein the rotor 212 is internal to the stator, and its redundant channels 216A and 216B.

Figure 8:
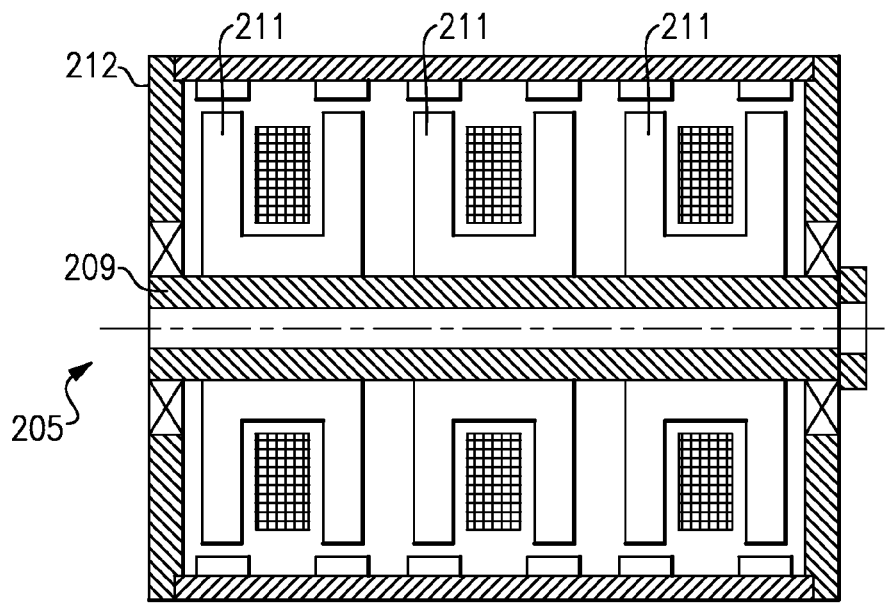
FIG. 8 shows yet another option.

As shown in FIG. 8, a three-phase transverse flux motor 205 can be provided that has an internal stator 209 and an external rotor 212. The external stator 209 provides three phases through stator coils 211.

Figure 9:
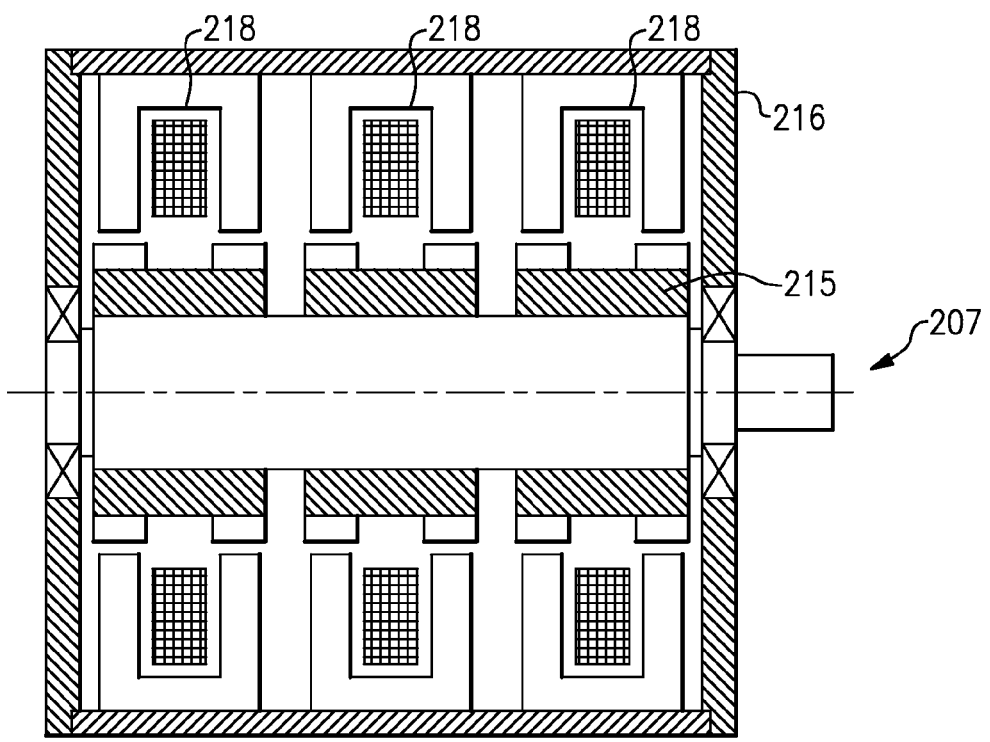
FIG. 9 shows yet another option.

FIG. 9 shows an alternative machine 207 wherein the rotor 215 is internal, and the stator 216 and its three phases 218 are external.

Figure 10:
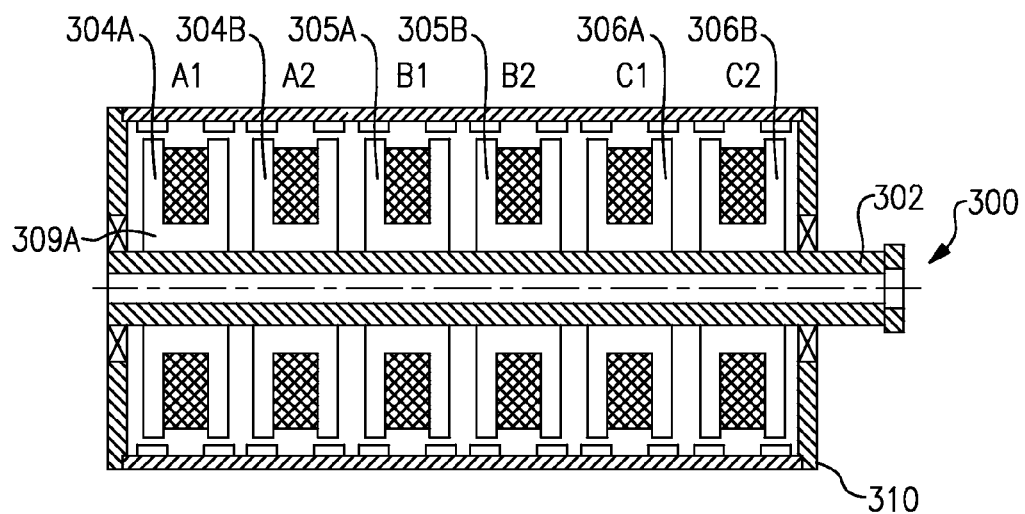
FIG. 10 shows yet another option.

FIG. 10 shows a three-phase machine, again having redundant circuits for fault tolerance. In FIG. 8 machine 300, the stator 302 is internal, and includes pole pieces 304A/B, 305A/B, and 306A/B, and an external rotor 310. Of course, an external stator can also be used in a similar embodiment.

Figure 11:
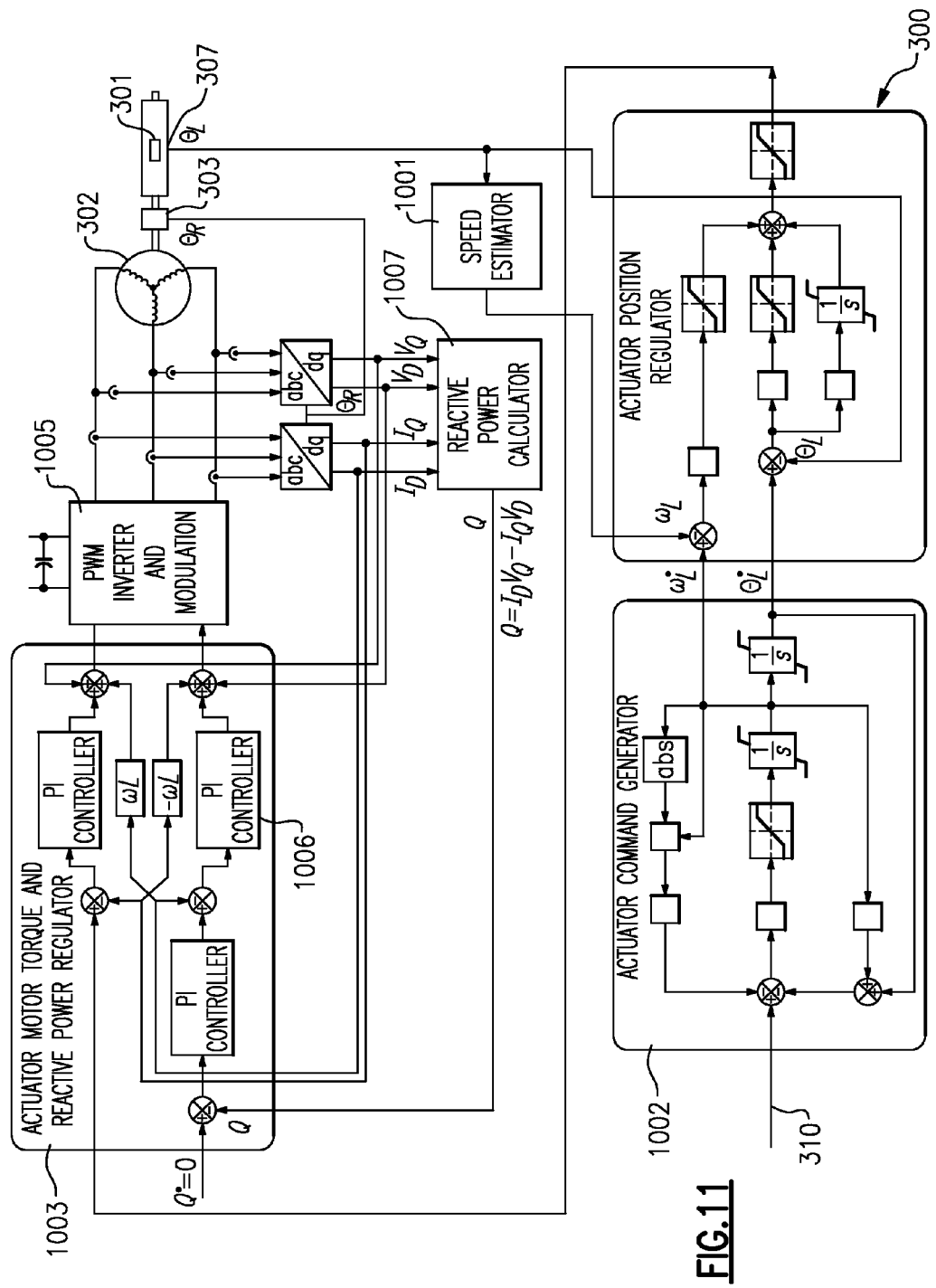
FIG. 11 shows a control circuit for any one of the embodiments as described above.

A control circuit 300 is shown in FIG. 11. The electromechanical actuator 301 receives three phases of power 302 from any one of the embodiments illustrated in this application. Angular feedback extends from a motor position sensor 303 and an actuator position sensor 301 back to the control. A speed estimator 1001 also provides feedback to an actuator command generator 1002 and an actuator position regulator 300. An actuator position command 310 extends into these blocks. Further, actuator motor torque and reactive power regulators 1003 also provide feedback to control the power supplied to the three phases 302 via PWM inverter 1005.

Essentially, the actuator controller has three distinctive blocks: a command generator 1002, an actuator position regulator 300, and a motor torque and reactive power regulator 1003. The command generator generates optimal time-varying velocity and position references in response to the actuator input position command. The actuator position regulator is responsive to the input references by closing actuator velocity in position routes. The output of the position regulator is a motor torque-producing current reference $I_q^*$. The motor torque and reactive power regulator utilize a synchronous rotating reference frame controls with cross-coupling in voltage feedforward terms. Motor torque is controlled in response to the $I_q^*$ current reference by closing $I_q$ current loop utilizing a PI controller 1006. Reactive power reference Q* is set to zero to achieve unity power factor operation. Closed loop reactive power control generates a negative $I_d^*$ current reference at the PI controller output.

The direct and quadrature feedback voltage and currents are derived at the output of the abc-to-dq transformation blocks which are synchronized with the motor rotor position. $I_{dq}$ and $V_{dq}$ variables, and are also used to compute reactive power feedback signal Q, block 1007.

Figure 12:
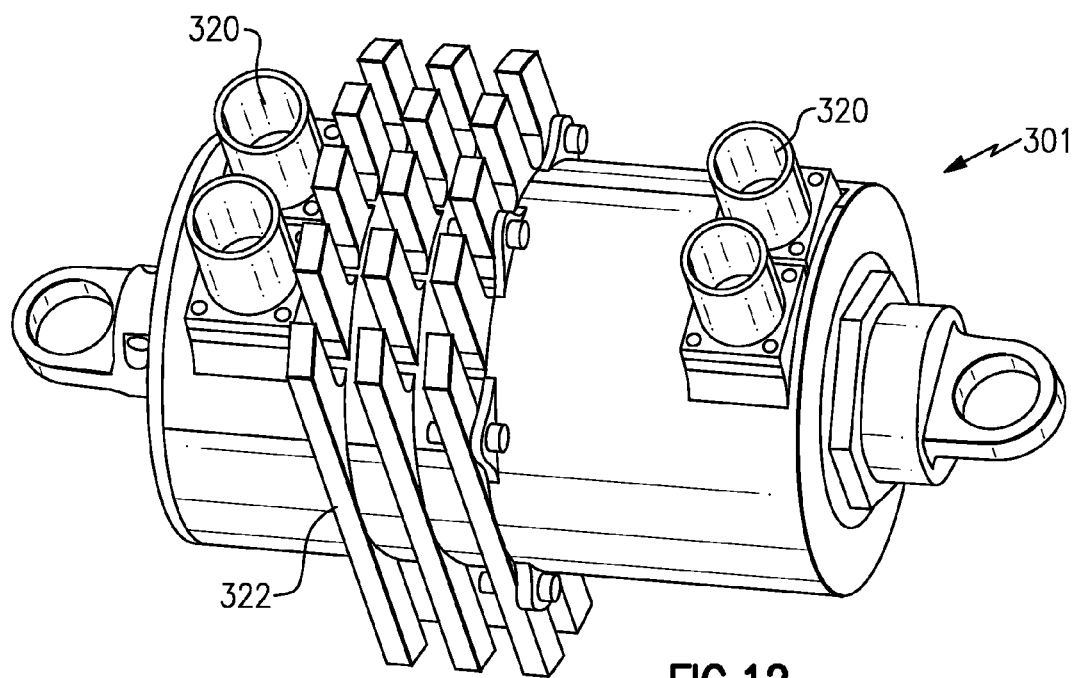
FIG. 12 shows a perspective view of an electromechanical actuator according to this application.

FIG. 12 shows the actuator 301 having electrical connection 320, and a heat sink 322.

The present invention provides a much lighter weight electromechanical actuator. Moreover, given the elimination of the gear trains, a motor may be provided with a redundant set of paths, such that it is more fault resistant, and yet still results in a lighter weight electromechanical actuator than has been provided in the prior art.

The use of the transverse flux machine provides benefits (high power density, compact construction, simple winding, low winding losses, high efficiency, modular construction, fault tolerance) when compared to a standard flux machine.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. An electromechanical actuator for controlling the position of an aircraft component comprising:
   a linear actuator to be driven to position a component;
   a transverse flux motor driving said linear actuator to move in a linear direction and control the position of the component; and
   said motor carries a redundant set of coils.

2. The system as set forth in claim 1, wherein a ball screw connection connects said motor to said linear actuator.

3. The system as set forth in claim 2, wherein said motor drives a first gear which engages and drives an output gear to in turn drive a rotating threaded member to move said ball screw, and move said linear actuator.

4. The system as set forth in claim 2, wherein said motor directly drives a threaded member to move said ball screw, and drive said linear actuator.

5. The system as set forth in claim 1, wherein there are three phases of redundant coils.

6. The system as set forth in claim 1, wherein said motor includes an internal stator having at least one coil.

7. The system as set forth in claim 1, wherein said motor has an external stator having at least one coil.

8. They system as set forth in claim 1, wherein said redundant set of coils provide fault tolerance.

9. An aircraft component and drive comprising:
   an electromechanical actuator controlling the position of an aircraft component;
   said electromechanical actuator including a linear actuator to position said component;
   a transverse flux motor driving said linear actuator to move in a linear direction and control the position of said component; and
   said motor carries a redundant set of coils.

10. The aircraft component as recited in claim 9, wherein a ball screw connection connects said motor to said linear actuator.

11. The aircraft component as recited in claim 9, wherein said motor includes an internal stator having at least one coil.

12. The aircraft component as recited in claim 9, wherein said motor has an external stator having at least one coil.

13. The aircraft component as recited in claim 9, wherein said motor is a three-phase motor, and there are redundant coils for each of said three-phases.

14. The aircraft component as recited in claim 9, wherein said component controls aerodynamic properties.

15. The aircraft component as recited in claim 9, wherein said redundant set of coils provide fault tolerance.

* * * * *